United States Patent [19]

Tsividis

[11] Patent Number: 4,903,226
[45] Date of Patent: Feb. 20, 1990

[54] SWITCHED NETWORKS

[76] Inventor: Yannis Tsividis, 601 W. 113th St. #11-F, New York, N.Y. 10025

[21] Appl. No.: 122,059

[22] Filed: Nov. 18, 1987

Related U.S. Application Data

[63] Continuation-in-part of Ser. No. 90,126, Aug. 27, 1987, Pat. No. 4,873,661.

[51] Int. Cl.$^4$ ............................................. G06R 15/46
[52] U.S. Cl. ................................... 364/807; 357/30; 307/201
[58] Field of Search ............... 364/807, 133, 602, 715, 364/131, 800; 330/277; 307/304, 201; 367/105, 901

[56] References Cited

U.S. PATENT DOCUMENTS

| | | | |
|---|---|---|---|
| 3,655,958 | 4/1972 | West | 364/807 X |
| 3,691,400 | 9/1972 | Askew | 307/201 |
| 4,660,166 | 4/1987 | Hopfield | 364/807 |
| 4,719,591 | 1/1988 | Hopfield et al. | 364/807 |
| 4,731,747 | 3/1988 | Denker | 364/807 |
| 4,737,929 | 4/1988 | Denker | 364/807 |
| 4,752,906 | 6/1886 | Kleinfeld | 364/807 |
| 4,755,963 | 7/1988 | Denker et al. | 364/807 |
| 4,760,437 | 7/1988 | Denker et al. | 357/30 |

Primary Examiner—Michael R. Fleming
Attorney, Agent, or Firm—Brumbaugh, Graves, Donohue & Raymond

[57] ABSTRACT

Techniques are described for making electronic neural networks with variable synapse strengths using the variability of transistor conductance or transconductance with gate bias and utilizing capacitors for the temporary storage of the gate bias used for control.

9 Claims, 1 Drawing Sheet

SWITCHED NETWORKS

RELATED APPLICATION

This application is a continuation in part of application, filed Aug. 27, 1987, Ser. No. 090,126, now U.S. Pat. No. 4,873,661 and entitled Switched Neural Networks.

SPECIFICATION

This invention relates to electronic neural networks useful for high speed signal processing and for artificial intelligence.

BACKGROUND OF THE INVENTION

There is increasing interest in computation circuits that operate at high speed with many inputs to provide signal processing and/or artificial intelligence. Systems of integrated circuits of the kind particularly useful for employing associative memory to provide artificial intelligence, including pattern recognition and optimization processes, are now often described as neural networks. Such systems are usually characterized by the need for many thousands of components.

As used herein, the term neural network applies to a network which utilizes a large number of interconnected linear or nonlinear circuit elements or neurons, many of which are characterized by connection strengths, or synapses, having coefficients that are continuously variable to adapt the network to its operating environment including both stored information and newly learned information.

Systems of the kind needed for these tasks are still in the rudimentary stage and leave considerable room for improvement. In particular much of the effort hitherto has been on digital techniques. This increases the number of computing and processing operations needed because of the need to work with binary digits. Networks that operate on analog rather than digital signals offer considerable promise for more efficient operation.

In my earlier above-identified application there are disclosed switched capacitor circuits that use transistors particularly of the field-effect type, and advantageously of the MOS type with capacitors to provide analog neural circuits or neurons that are assembled into analog neural networks.

An important characteristic of neural networks is that these networks can be made programmable, a property that is essential in such applications as learning machines, signal processors and programmable associative memories. Programmability requires modification of the strengths of the "synapses" or elemental input branches of a neuron circuit. The present invention relates to analog circuits for providing neural networks in which the synapse strengths of its neurons are continuously variable, thus making feasible programmable neural networks of compact size.

SUMMARY OF THE INVENTION

The basic technique involved in the invention relies on the fact that the conductance, or the transconductance, of a field effect transistor, and especially advantageously an metal oxide-semiconductor (MOS) transistor, can be varied by changing the bias point of the transistor. To this end, the invention comprises a neural network including "resistive" synapses, or input branches, in which each resistance is provided by a voltage controlled element, for example a field effect transistor, and most advantageously by an MOS transistor whose gate bias or control voltage is established by an individual capacitor connected to its gate, the voltage on which is controlled so that each transistor, and so individual synopses, of the neurons of the neural network may be separately controlled. In particular, each capacitor is connected to a control voltage generator by way of a separate switch and as each switch is closed in turn, the applied output of the control voltage generator assumes the appropriate value for charging the corresponding capacitor. The capacitors of the various synapses are accessed in any of known schemes, for example such as is used in semiconductor memories, where here the data stored is an analog control voltage rather than a digital bit. Once the appropriate control voltages have been stored in the individual capacitors, the neural network is activated and its output read after settling. The capacitors are accessed regularly, either to refresh particular storage values, which might otherwise vary because of leakage, or to implement a new set of synapse strengths as for example, as part of a learning procedure. A good learning algorithm could, in principle, be made rather immune to the effect of transistor tolerances, mismatches and nonlinearities, or alternatively, one may use a variety of tuning schemes, for example as described in a paper entitled "Continuous-time MOSFET-C Filters in VLSI" IEEE Trans. Circ. Syst. Vol. CAS-33 Feb. 1986, pp. 125-140, by Tsividis, Y., Banu, M., and Khoury, J.

DETAILED DESCRIPTION

Figure 1:
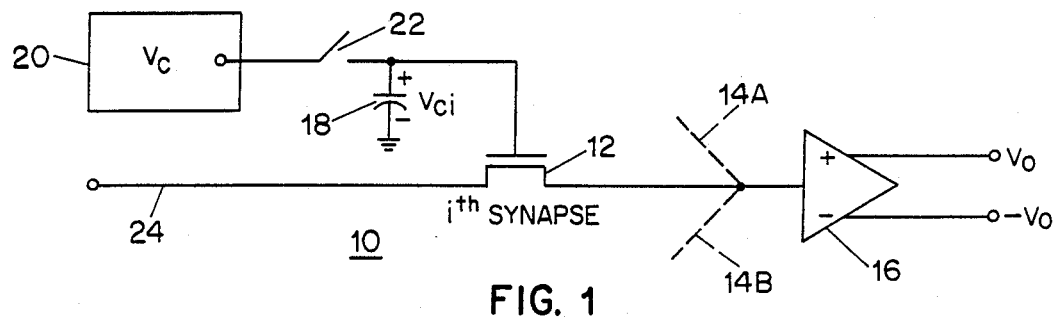
FIG. 1 shows a basic circuit in which one synapse has been simulated by an MOS transistor whose gate voltage is set by a capacitor whose analog voltage is set periodically by a control voltage generator by way of an electronic switch that is periodically closed in accordance with one embodiment of the invention.

With reference now to the drawing, FIG. 1 shows a portion of a neural network 10 including a plurality of voltage controlled resistors or transconductors, for example, of the kind described generally in the following papers:

"Continuous-time MOSFET-C Filters in VLSI" IEEE Trans. Circ. Syst. Vol. CAS33 Feb. 1986, pp. 125-140, by Tsividis, Y., Banu, M., and Khoury, J.

"CMOS Triode Transconductance Continuous-time Filters," Proc. 1986 Custom Int. Circ. Conf., pp. 378-381, by Pennock, Frith and Booker In particular, each resistive synapse is simulated by an MOS transistor of which only 12 is shown. The broken lines 14A, 14B indicate connections to other similar synapses each of which may be of different strength.

Typically, there may be many tens of synapses connected to supply a common input terminal, for example, of a complementary output amplifier 16, as shown, whose outputs can be supplied as inputs to other neurons of the neutral network, or as outputs of the neural network. Alternatively, different synapses might supply different inputs of a differential amplifier when differences are desired. Complementary output amplifier 16 is useful to provide balanced excitatory and inhibitory outputs for connection to other portions of the neural network as desired. However, in some instances, it may be adequate to employ a single ended amplifier in place of complementary output amplifier 16. Each transistor will resemble resistors whose conductance is related both to the geometry of the transistor as well as to the applied gate voltage. In accordance with the preferred embodiment of the invention, the gate voltage of each transistor and thereby the multiplier coefficient of the associated synapse, is kept constant at a particular value and for a prescribed interval long enough for a cycle of operation by connecting a capacitor 18 as shown, having one terminal connected to a source 20 of a desired control voltage $V_C$ and to the gate of the transistor 12 and its other terminal to a point of reference potential, shown as ground. The control voltage is supplied by closing an electronic switch 22, typically another MOS transistor. This permits the capacitor 18 to be charged to the voltage of the source 20 and to hold this voltage even after the switch is opened. The source electrode of transistor 12 is supplied by way of an input terminal 24, typically with the output of a neuron circuit from another portion of the neural network, although in some instances with an output of amplifier 16.

The multiplier coefficient of a particular synapse can also be controlled by choice of the geometry of the transistor, particularly the length to width ratio of the channel of the transistor.

If the control voltage $V_C$ is large in comparison to the drain-source voltage of transistor 12, the nonlinearity of the synapse formed thereby will be small and the synapse will resemble a linear resistor whose conductance will be a function of $V_C$ and the fixed parameters of the transistor 12.

If the synapse nonlinearities interfere with proper operation, then the circuit arrangement may be modified to employ a balanced arrangement using a pair of transistors. Such an arrangement is shown in FIG. 2.

Figure 2:
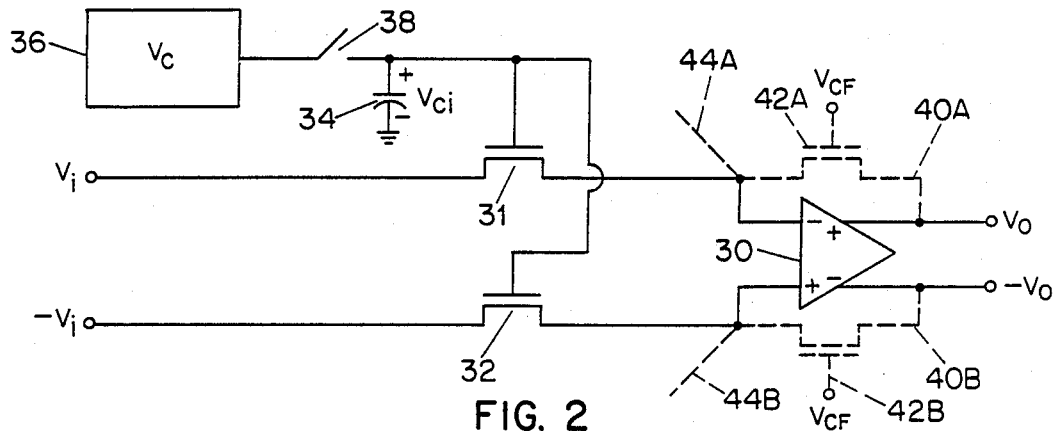
FIG. 2 shows an embodiment in which a matched pair of transistors is used to simulate a pair of synapses driven by balanced voltages to achieve nonlinearity cancellation for use when a high degree of linearity is desired.

FIG. 2 shows a circuit arrangement which uses a balanced amplifier 30 that employs pairs of synapses or input branches including matched MOS transistors 31 and 32 in the inverting and non-inverting input branches, respectively. Each of transistors 31, 32 has its gate voltage controlled by the capacitor 34 that is charged periodically by the voltage control source 36 by way of the switch 38, as previously described in connection with FIG. 1. The source electrodes of transistors 31, 32 are supplied by balanced input voltages, i.e. equal and opposite voltages as is customary in balanced amplifier circuits. As a consequence there are available at the output terminals of the amplifier balanced output voltages with nonlinearities cancelled. As is usual in such circuits, the gain of the amplifier 30 may be controlled by controlling feedback between its input and output terminals. Appropriate feedback paths are shown by the broken lines 40A, 40B, each path including its own transistor 42A, 42B whose conductance is controlled by its gate voltage VCF Moreover additional balanced synapses may be included to supply input voltages to the amplifier 30 as indicated by the broken lines 44A, 44B.

Figure 3:
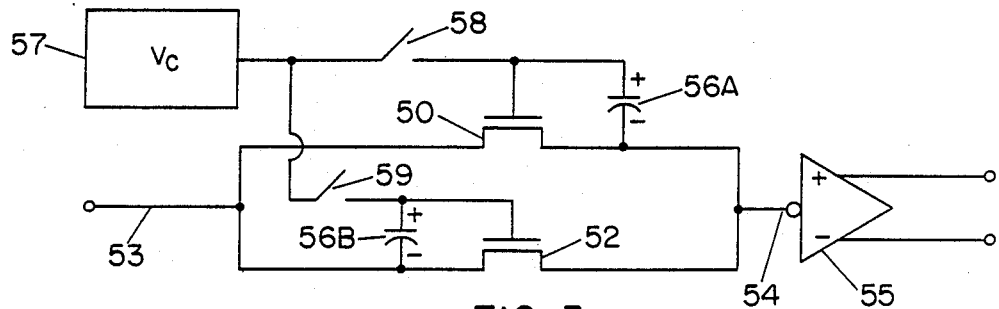
FIG. 3 shows an embodiment that employs a parallel pair of transistors each controlled separately by its associated capacitor.

Another circuit arrangement useful for cancelling non-linearities is shown in FIG. 3. In this arrangement, the source/drain circuit branches of matched MOS transistors 50 and 52 are connected in parallel between nodes 53 and 54, and matched capacitors 55 and 56 are used to control the gate voltages of the two transistors, respectively. Each of capacitors 55 and 56 is supplied with the same control voltage from source 57 by way of switches 58 and 59, respectively. For cancellation of non-linearities in the two transistors, transistor 50 has its capacitor 55 connected between gate and drain while transistor 52 has its capacitor 56 connected between gate and source.

The specific arrangements described are merely illustrative of a variety of combining arrangements that can be used to cancel non-linearities. Various other arrangements are discussed in a paper of Tsividis, Banu and Khoury, entitled "*Continuous-time MOSFET-C filters in VLSI*" IEEE Trans. Circ. Syst. Vol. CAS-33, Reb. 1986, pp. 125-140. In particular, parallel combination of n-channel and pchannel MOS transistors can also be used for non-linearity cancellation.

Moreover, various other combining arrangements of increasing complexity can also be used. For example, the input branches, or synapses, and the main amplifier part of a neuron can be implemented using differential pairs, for example, with a common load, as for example, is known in continuous-time filters as described in a paper by Pennock, Frith and Booker, entitled "*CMOS Triode Transconductance Continuous-time Filters*," Proc. 1986 Custom Int. Circ. Conf., pp. 378-381, or multiple-input operational amplifiers, as for example described in a paper by De Plaza and Morlon, entitled "*Power Supply Rejection in Differential Switched-Capacitor Filters*," IEEE J. Solid-St. Circ. 1984, Vol. SC-19, pp. 912-918.

Moreover, each input pair can have its transconductance individually tuned, thus allowing for individually controlled synapse strengths. Such a circuit is shown in FIG. 4 where each control voltage sets the bias point of each pair.

Figure 4:
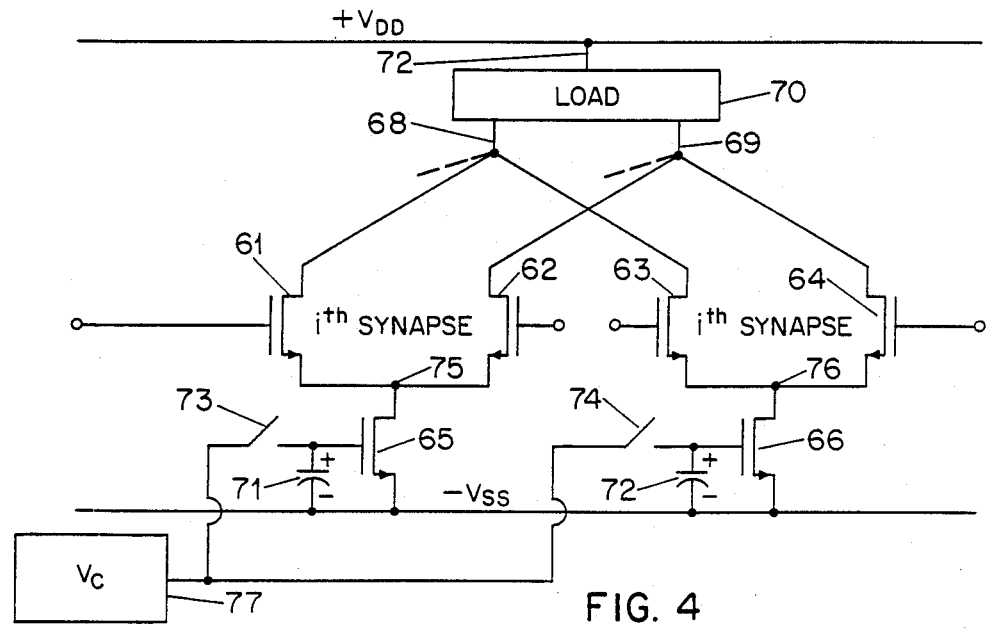
FIG. 4 shows an embodiment in which the synapses and the main part of a neuron are implemented using a differential pair with a common load in which each input pair has its transconductance individually tuned to permit individually controlled synapses strengths.

In FIG. 4 is shown a combining circuit using MOS transistors 61, 62, 63 and 64 in which transistors 61, 62 form a differential pair for one synapse and transistors 63, 64 form a differential pair of a second synapse. The sources of transistors 61 and 62 are connected to common node 75 and by way of the source/drain path or branch of MOS transistor 65 to the negative bus $V_{SS}$, and sources of transistors 63 and 64 are connected to a common node 76 and by way of the source/drain path of MOS transistor 66 to the negative bus $V_{SS}$. The drains of transistors 61 and 63 are connected to a load terminal 68 of the balanced load 70 and the drains of transistors 62 and 64 are connected to load terminal 69 of the load 70. The conductance of transistors 65 and 66 are controlled by the capacitors 71 and 72, respectively, each of which is connected between the negative bus and the gate of the corresponding transistor. Different strengths on the synapses may be set by different control voltages on capacitors 71, 72, each of which is supplied by way of its switch 73, 74 from a voltage source 77 that may be programmed for time sharing to supply different voltages to the capacitors 71, 72, if desired, in cooperation with closing of switches 75 and 74 at different times. The balanced load has its power terminal 72 connected to the positive bus $V_{DD}$.

The above scheme may obviously be generalized to other transconductor schemes, for example, of the kind described in the paper by Tsividis, Czarnul and Fang, entitled "MOS Transconductors and Integrators with High Linearity," Electronics Letters Vol. 22, No. 5, Feb. 86, Pp. 245–246. In particular, separate loads can be used for each input pair and the signals can be combined at a later stage.

As was suggested above, a single control voltage source can be time-shared by many synapses and neurons, connected to the corresponding capacitors through switches. As each switch is closed in turn, the control voltage source is programmed to assume the appropriate value for changing the corresponding capacitor. The various capacitors can be accessed using addressing schemes common in semiconductor memories, a basic difference from semiconductor memories being that the data stored in each capacitor in the instant invention is an analog control voltage rather than a digital bit.

Once the appropriate control voltage has been stored on the capacitors of a neural network, it can be activated in the usual fashion and after a settling interval, its output read-out for transfer as appropriate. The capacitors can be accessed periodically, either to refresh the stored values to overcome leakage, or to implement new synapses strengths, as may be required of a learning procedure in an artificial intelligence or other application. A good learning algorithm can, in principle, be made relatively immune to the effects of transistor parameter tolerances, mismatches, and nonlinearities; alternatively one can use a variety of tuning techniques, examples of which have been discussed above and are known from use in integrated continuous-time filters as discussed in the aforementioned referenced Tsividis, Banu and Khoury paper.

It should be understood that the specific embodiments described are merely illustrative of the general principles involved.

For example, it can be appreciated that differential pairs can also be used to provide d-c offsets ("neuron thresholds") if desired in a particular application. Moreover, as previously mentioned, although presently an MOS transistor would be preferred for serving as the voltage-variable element for controlling the strength or coefficient of individual synapses of a neuron, other elements are feasible for this role.

What is claimed:

1. A neural network comprising a plurality of neurons each having one or more synapse circuit means each comprising a voltage-variable resistive means, each voltage-variable resistive means including a control element, each of said synapse circuit means further comprising a capacitor one of whose plates is connected both to said control element and by way of a switch to a terminal of a variable control voltage source.

2. The neural network of claim 1 in which each of said voltage-variable resistive means comprises a field effect transistor including a control element whose voltage controls the conductance of the transistor.

3. The neural network of claim 2 in which the field effect transistor is an MOS transistor including a source, a drain and a gate in which the gate is the control element of the transistor.

4. The neural network of claim 3 in which each of the synapse circuit means includes a pair of MOS transistors whose source/drain branches are connected in parallel and one of the transistors has its capacitor connected between its gate and source and the other of said two transistors has its capacitor connected between its gate and drain and each of the two gates are connected to a common control voltage source terminal by way of a separate switch.

5. The neural network of claim 1 in which each neuron includes an amplifying means to which input signals are supplied by way of said voltage-variable resistive means.

6. The neural network of claim 5 in which each of the voltage-variable resistive means comprises an MOS transistor having a source, a drain and a gate, wherein the control element of the voltagevariable resistive means comprises the gate of the MOS transistor.

7. The neural network of claim 6 in which the source of each of said transistors is connected to an input terminal of said amplifying means supplied with signals to be combined by way of said MOS transistors.

8. The neural network of claim 7 in which the amplifying means is a differential amplifier having an inverting input terminal and a non-inverting input terminal and in which each synapse circuit means includes a pair of MOS transistors and said capacitor of each of said synapse circuit means is connected in the gate branch of each of said pair of transistors and the sources of the two transistors are connected to the inverting and non-inverting input terminals of the amplifying means, respectively.

9. A neural network including a plurality of synapse circuit means, each of which includes a pair of first and second MOS transistors, each MOS transistor having a source, a drain and a gate, the drains of the first transistors of each pair being connected to a first load node and the drains of the second transistors of each pair being connected to a second load node, a plurality of MOS control transistors each having its source/drain branch connected between sources of a respective pair of first and second transistors of each of said synapse circuit means and a point of reference potential, and including a capacitor in its gate/source branch and its gate being connected to a control voltage source by way of a separate switch, and load means connected between a voltage supply bus and the first and second load nodes.

* * * * *

UNITED STATES PATENT AND TRADEMARK OFFICE
CERTIFICATE OF CORRECTION

PATENT NO. : 4,903,226

DATED : Feb. 20, 1990

INVENTOR(S) : Yannis Tsividis

It is certified that error appears in the above-identified patent and that said Letters Patent is hereby corrected as shown below:

First page of patent, second column, 9th line, "6/1886" should read -- 6/1988 --.  Col. 2, line 5, "snyopses" should read -- synapses --.  Col. 3, line 5, "neutral metwork" should read -- neural network --; line 67, "VCF" should read -- $V_{CF}$ --. Col. 4, line 21, "Reb." should read -- Feb. --; line 23, "pchannel" should read -- p-channel --; line 50, "$V_{SS}$" should read -- $-V_{SS}$ --; line 53, "$V_{SS}$" should read -- $-V_{SS}$ --; line 66, "75" should read -- 73 --.  Col. 6, line 25, "voltagevariable" should read -- voltage-variable --.

Signed and Sealed this

Twenty-fifth Day of June, 1991

Attest:

*Attesting Officer*

HARRY F. MANBECK, JR.

*Commissioner of Patents and Trademarks*